(12) United States Patent
Yang et al.

(10) Patent No.: US 10,015,434 B2
(45) Date of Patent: *Jul. 3, 2018

(54) SWITCHED-MODE POWER SUPPLY FOR OUTPUTTING A STEADY VOLTAGE AND CURRENT AND TELEVISION INCLUDING THE SAME

(71) Applicant: SHENZHEN Skyworth-RGB ELECTRONIC CO., LTD, Shenzhen (CN)

(72) Inventors: Jitao Yang, Shenzhen (CN); Jianzhong Chen, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,064

(22) Filed: Apr. 24, 2017

(65) Prior Publication Data

US 2017/0310923 A1    Oct. 26, 2017

Related U.S. Application Data

(63) Continuation of application No. PCT/CN2016/096739, filed on Aug. 25, 2016.

(30) Foreign Application Priority Data

Apr. 22, 2016  (CN) .......................... 2016 1 0257721

(51) Int. Cl.
  *H02M 1/08*      (2006.01)
  *H04N 5/63*      (2006.01)
  (Continued)

(52) U.S. Cl.
  CPC .......... *H04N 5/63* (2013.01); *H02M 3/33507* (2013.01); *H05B 33/0815* (2013.01)

(58) Field of Classification Search
  CPC .......... H02M 2001/0003; H02M 1/08; H02M 3/33507; H02M 3/33546
  (Continued)

(56) References Cited

U.S. PATENT DOCUMENTS 4,441,147 A * 4/1984 Schwarz ........... H02M 3/33507
                                                                320/137
4,649,464 A * 3/1987 Shono ................. H02M 3/3385
                                                                363/21.15
(Continued)

FOREIGN PATENT DOCUMENTS

CN      103313003 A      9/2013
CN      103813595 A      5/2014
(Continued)

OTHER PUBLICATIONS

Office action of patent application CN201610257721.X from CNIPO (dated Mar. 28, 2017).

Primary Examiner — Jeffrey Sterrett
(74) Attorney, Agent, or Firm — Wayne & King LLC

(57) ABSTRACT

A switched-mode power supply and an associated television are disclosed. The switched-mode power supply includes a rectifier circuit, a transformer, a constant voltage control circuit, a power management circuit, and a constant current control circuit. An output terminal of the rectifier circuit is coupled both to a power detection terminal of the power management circuit and to a power input terminal of the transformer. A controlled terminal of the transformer is coupled to a control terminal of the power management circuit. A constant voltage output winding of the transformer is coupled through the constant voltage control circuit to a feedback input terminal of the power management circuit. A constant current output winding of the transformer is coupled to the constant current control circuit via an LED load. The solution of the present disclosure has the advantage of low cost.

20 Claims, 5 Drawing Sheets

(51) Int. Cl.
*H02M 3/335* (2006.01)
*H05B 33/08* (2006.01)

(58) Field of Classification Search
USPC ............ 363/21.04, 21.07, 21.08, 21.09, 21.1, 363/21.12, 21.15, 21.16, 21.17, 21.18, 97
See application file for complete search history.

(56) References Cited

U.S. PATENT DOCUMENTS

| | | | | |
|---|---|---|---|---|
| 5,903,183 | A * | 5/1999 | Inukai | G03G 15/1675 327/540 |
| 5,956,240 | A | 9/1999 | Williams | |
| 6,833,692 | B2 * | 12/2004 | Balakrishnan | H02M 3/156 323/284 |
| 7,054,170 | B2 * | 5/2006 | Yang | H02M 3/33507 363/21.13 |
| 7,859,862 | B2 * | 12/2010 | Lin | H02M 3/33523 363/21.12 |
| 8,040,699 | B2 * | 10/2011 | Huynh | H02M 3/33523 361/18 |
| 8,125,798 | B2 * | 2/2012 | Huynh | H02M 3/335 363/147 |
| 9,019,729 | B2 * | 4/2015 | Kleinpenning | H02M 3/24 363/21.12 |
| 2010/0128501 | A1 * | 5/2010 | Huang | H02M 3/33523 363/21.16 |
| 2010/0232186 | A1 | 9/2010 | Nakata | |
| 2010/0321956 | A1 * | 12/2010 | Yeh | H02M 3/33507 363/16 |
| 2012/0224397 | A1 * | 9/2012 | Yeh | H02M 3/33507 363/21.12 |
| 2013/0148387 | A1 * | 6/2013 | Ren | H02M 1/36 363/21.16 |
| 2016/0322911 | A1 | 11/2016 | Hou et al. | |
| 2017/0229969 | A1 * | 8/2017 | Chen | H02M 3/33507 |
| 2017/0231041 | A1 * | 8/2017 | Yang | H05B 33/0815 |
| 2017/0310923 | A1 * | 10/2017 | Yang | H04N 5/63 |
| 2018/0007749 | A1 * | 1/2018 | Ouyang | H05B 33/0809 |

FOREIGN PATENT DOCUMENTS

| | | |
|---|---|---|
| CN | 105322803 A | 2/2016 |
| CN | 105375777 A | 3/2016 |
| CN | 105813263 A | 7/2016 |

* cited by examiner

SWITCHED-MODE POWER SUPPLY FOR OUTPUTTING A STEADY VOLTAGE AND CURRENT AND TELEVISION INCLUDING THE SAME

CROSS-REFERENCE TO RELATED APPLICATIONS

This application is a continuation of International Patent Application No. PCT/CN2016/096739 with a filing date of Aug. 25, 2016, designating the United States, now pending, and further claims priority to Chinese Patent Application No. 201610257721.X with a filing date of Apr. 22, 2016, designating the United States, now pending. The content of the aforementioned applications, including any intervening amendments thereto, are incorporated herein by reference.

TECHNICAL FIELD

Embodiments of the present disclosure relate generally to television technology, and more particularly to a switched-mode power supply and an associated television.

BACKGROUND OF THE PRESENT INVENTION

A traditional switched-mode power supply may have an architecture as shown in FIG. 1. To output a constant voltage source high-voltage electrolytic capacitors would be required for filtering of the rectified voltage, while constant current conversion may further required to derive a constant current source. However, high-voltage electrolytic capacitors are expensive, resulting in a high cost of the switched-mode power supply.

SUMMARY OF PRESENT INVENTION

It is the primary objective of the present disclosure to provide a switched-mode power supply intended to reduce the cost of the switched-mode power supply.

To the above end, there is provided a switched-mode power supply comprising a rectifier circuit, a transformer, a constant voltage control circuit, a power management circuit, and a constant current control circuit. An output terminal of the rectifier circuit is coupled both to a power detection terminal of the power management circuit and to a power input terminal of the transformer. A controlled terminal of the transformer is coupled to a control terminal of the power management circuit. A constant voltage output winding of the transformer is coupled through the constant voltage control circuit to a feedback input terminal of the power management circuit. A constant current output winding of the transformer is coupled to the constant current control circuit via an LED load. The power management circuit may be configured to control the operating state of the transformer according to the power supply voltage inputted to the transformer, so as to enable the constant voltage output winding to output a constant voltage and the constant current output winding to output a constant current. The constant voltage control circuit may be used to feed back a voltage outputted by the constant voltage output winding to the power management circuit, so that the power management circuit can control the constant voltage output winding of the transformer to output a constant voltage. The constant current control circuit may be used to control the current flowing through the LED load to remain constant.

The power management circuit may comprise a switch circuit and a switch control circuit. A detection terminal of the switch control circuit is the power detection terminal of the power management circuit. A feedback terminal of the switch control circuit is the feedback input terminal of the power management circuit. A control terminal of the switch control circuit is coupled to a controlled terminal of the switch circuit. A control terminal of the switch circuit is the control terminal of the power management circuit.

The switch control circuit may comprise a control chip, a first capacitor, a first resistor, a second resistor, a third resistor, a fifth resistor, a sixth resistor, and a seventh resistor. An OFF-timing terminal of the control chip is grounded via the first capacitor, while an OFF-trigger terminal of the control chip is coupled to a first terminal of the fifth resistor, a second terminal of the fifth resistor being configured to input an OFF-trigger signal. A switch control terminal of the control chip is the control terminal of the switch control circuit. An ON-time setting terminal of the control chip is grounded via the third resistor and coupled through the second resistor to a first terminal of the first resistor, the second terminal of the first resistor being the detection terminal of the switch control circuit. A feedback terminal of the control chip is grounded via the seventh resistor and the sixth resistor in series, a node connecting the sixth and the seventh resistors being the feedback terminal of the switch control circuit.

The switch circuit may comprise a first switch tube and a fourth resistor. A drain of the first switch tube is a control terminal of the switch circuit. A gate of the first switch tube is a controlled terminal of the switch circuit. A source of the first switch tube is coupled to a first terminal of the fourth resistor, a second terminal of the fourth resistor being grounded, a node connecting the first switch tube and the fourth resistor being configured to output an OFF-trigger signal.

The power management circuit may further comprise an eighth resistor and a ninth resistor. An overvoltage/undervoltage protection terminal of the control chip has a common connection with a first terminal of the eighth resistor and a first terminal of the ninth resistor. A second terminal of the ninth resistor is grounded, while a second terminal of the eighth resistor is coupled to an input terminal of the rectifier circuit.

The power management circuit may further comprise a first diode, a second diode, a first transistor, a second capacitor, a third capacitor, a tenth resistor, an eleventh resistor, a twelfth resistor, a thirteenth resistor, and a fourteenth resistor. A first terminal of the tenth resistor is coupled to the power detection terminal, while a second terminal of the tenth resistor is coupled to a first terminal of the eleventh resistor. A second terminal of the eleventh resistor has a common connection with an emitter of the first transistor, an anode of the second capacitor, and a power terminal of the control chip, a cathode of the second capacitor being grounded. A base of the first transistor has a common connection with a cathode of the first diode, a first terminal of the fourteenth resistor, and a first terminal of the thirteenth resistor, an anode of the first diode and a second terminal of the fourteenth resistor being grounded. A collector of the first transistor is coupled to a first terminal of the twelfth resistor. A second terminal of the twelfth resistor has a common connection with a second terminal of the thirteenth resistor, a cathode of the second diode, and an anode of the third capacitor, a cathode of the third capacitor being grounded, an anode of the second diode being coupled to an auxiliary winding of the transformer.

The constant voltage control circuit may comprise a first voltage regulating tube, a fourth capacitor, an optocoupler, a fifteenth resistor, a sixteenth resistor, a seventeenth resistor, and an eighteenth resistor. An emitter of the optocoupler is grounded. A collector of the optocoupler is a feedback output terminal of the constant voltage control circuit. A cathode of the optocoupler has a common connection with a first terminal of the fourth capacitor and a cathode of the first voltage regulating tube. A second terminal of the fourth capacitor is coupled to a first terminal of the sixteenth resistor. A second terminal of the sixteenth resistor has a common connection with a second terminal of the seventeenth resistor, a first terminal of the eighteenth resistor, and a regulating terminal of the first voltage regulating tube. An anode of the first voltage regulating tube and a second terminal of the eighteenth resistor are grounded. A first terminal of the seventeenth resistor is coupled to a first terminal of the fifteenth resistor. A second terminal of the fifteenth resistor is coupled to an anode of the optocoupler. A node connecting the fifteenth and the seventeenth resistor is an input terminal of the constant voltage control circuit.

The constant current control circuit may comprise a reference voltage output unit, a constant current control unit, a switch unit, and a switch control unit. A controlled terminal of the switch unit is coupled to a control terminal of the switch control unit. An input terminal of the switch unit is coupled to the LED load. An output terminal of the switch unit is coupled to a control terminal of the constant current control unit. A power terminal of the constant current control unit is coupled to an output terminal of the reference voltage output unit.

The constant current control unit may comprise a twenty-ninth resistor, a thirtieth resistor, and a number of n transistors. Bases of the n transistors, a first terminal of the twenty-ninth resistor, and a first terminal of the thirtieth resistor are coupled to each other, a second terminal of the thirtieth resistor being grounded, a second terminal of the twenty-ninth resistor being configured to input a reference voltage. Collectors of the transistors are coupled to each other and a connection node thereof is the control terminal of the constant current control unit. An emitter of each of the n transistors is grounded via a current limiting resistor, n being a natural number.

The reference voltage output unit may comprise an input terminal configured to input a constant-current enable signal for controlling the ON-OFF of the LED load. The reference voltage output unit may comprise a second transistor, a third transistor, a nineteenth resistor, a twentieth resistor, a twenty-first resistor, and a twenty-second resistor. A first terminal of the nineteenth resistor may be configured to input a reference voltage. A second terminal of the nineteenth resistor is coupled to an emitter of the second transistor. A collector of the second transistor is coupled to a first terminal of the twentieth resistor, a second terminal of the twentieth resistor being the output terminal of the reference voltage output unit. A base of the second transistor is coupled to a first terminal of the twenty-first resistor. A second terminal of the twenty-first resistor is coupled to a collector of the third transistor, an emitter of the third transistor being grounded. A base of the third transistor is coupled to a first terminal of the twenty-second resistor, a second terminal of the twenty-second resistor being an input terminal of the reference voltage output unit.

The switch unit may comprise a second switch tube. A drain of the second switch tube is the input terminal of the switch unit. A source of the second switch tube is the output terminal of the switch unit. A gate of the second switch tube is the controlled terminal of the switch unit.

The switch control unit may comprise a fourth transistor, a fifth transistor, a twenty-third resistor, a twenty-fourth resistor, a twenty-fifth resistor, and a twenty-sixth resistor. A first terminal of the twenty-third resistor may be configured to input a PWM signal. A second terminal of the twenty-third resistor is coupled to a base of the fourth transistor. A collector of the fourth transistor has a common connection with a first terminal of the twenty-fourth resistor and a base of the fifth transistor. Emitters of the fourth and fifth transistors are grounded. A collector of the fifth transistor has a common connection with a first terminal of the twenty-fifth resistor and a first terminal of the twenty-sixth resistor. A second terminal of the twenty-fourth resistor and a second terminal of the twenty-fifth resistor are coupled to the constant voltage output winding. A second terminal of the twenty-sixth resistor is the control terminal of the switch control unit.

The switched-mode power supply may further comprise a correction circuit. An input terminal of the correction circuit is coupled to the feedback output terminal of the constant current control circuit and to the input terminal of constant voltage control circuit.

The correction circuit may comprise a third diode, a fifth capacitor, a twenty-seventh resistor, and a twenty-eighth resistor. A first terminal of the twenty-eighth resistor is the input terminal of the correction circuit. A second terminal of the twenty-eighth resistor has a common connection with an anode of the fifth capacitor, and a first terminal of the twenty-seventh resistor. A cathode of the fifth capacitor is grounded. A second terminal of the twenty-seventh resistor is coupled to an anode of the third diode. A cathode of the third diode is the output terminal of the correction circuit.

There is also provided a television that comprises the above switched-mode power supply, the switched-mode power supply comprising a rectifier circuit, a transformer, a constant voltage control circuit, a power management circuit and a constant current control circuit. An output terminal of the rectifier circuit is coupled both to a power detection terminal of the power management circuit and to a power input terminal of the transformer. A controlled terminal of the transformer is coupled to a control terminal of the power management circuit. A constant voltage output winding of the transformer is coupled through the constant voltage control circuit to a feedback input terminal of the power management circuit. A constant current output winding of the transformer is coupled to the constant current control circuit via an LED load. The power management circuit may be configured to control the operating state of the transformer according to the power supply voltage inputted to the transformer, so as to enable the constant voltage output winding to output a steady voltage and the constant current output winding to output a steady current. The constant voltage control circuit may be used to feed back a voltage outputted by the constant voltage output winding to the power management circuit, so that the power management circuit can control the constant voltage output winding of the transformer to output a constant voltage. The constant current control circuit may be used to control the current flowing through the LED load to remain constant.

The power management circuit may comprise a switch circuit and a switch control circuit. A detection terminal of the switch control circuit is the power detection terminal of the power management circuit. A feedback terminal of the switch control circuit is the feedback input terminal of the power management circuit. A control terminal of the switch control circuit is coupled to a controlled terminal of the switch circuit. A control terminal of the switch circuit is the control terminal of the power management circuit.

The switch control circuit may comprise a control chip, a first capacitor, a first resistor, a second resistor, a third resistor, a fifth resistor, a sixth resistor, and a seventh resistor. An OFF-timing terminal of the control chip is grounded via the first capacitor, while an OFF-trigger terminal of the control chip is coupled to a first terminal of the fifth resistor, a second terminal of the fifth resistor being configured to input an OFF trigger. A switch control terminal of the control chip is the control terminal of the switch control circuit. An ON-time setting terminal of the control chip is grounded via the third resistor and coupled through the second resistor to a first terminal of the first resistor, the second terminal of the first resistor being the detection terminal of the switch control circuit. A feedback terminal of the control chip is grounded via the seventh resistor and the sixth resistor in series, a node connecting the sixth and the seventh resistors being the feedback terminal of the switch control circuit.

The switch circuit may comprise a first switch tube and a fourth resistor. A drain of the first switch tube is a control terminal of the switch circuit. A gate of the first switch tube is a controlled terminal of the switch circuit. A source of the first switch tube is coupled to a first terminal of the fourth resistor, a second terminal of the fourth resistor being grounded, a node connecting the first switch tube and the fourth resistor being configured to output an OFF-trigger signal.

The power management circuit may further comprise an eighth resistor and a ninth resistor. An overvoltage/undervoltage protection terminal of the control chip has a common connection with a first terminal of the eighth resistor and a first terminal of the ninth resistor. A second terminal of the ninth resistor is grounded, while a second terminal of the eighth resistor is coupled to an input terminal of the rectifier circuit.

The power management circuit may further comprise a first diode, a second diode, a first transistor, a second capacitor, a third capacitor, a tenth resistor, an eleventh resistor, a twelfth resistor, a thirteenth resistor, and a fourteenth resistor. A first terminal of the tenth resistor is coupled to the power detection terminal, while a second terminal of the tenth resistor is coupled to a first terminal of the eleventh resistor. A second terminal of the eleventh resistor has a common connection with an emitter of the first transistor, an anode of the second capacitor, and a power terminal of the control chip, a cathode of the second capacitor being grounded. A base of the first transistor has a common connection with a cathode of the first diode, a first terminal of the fourteenth resistor, and a first terminal of the thirteenth resistor, an anode of the first diode and a second terminal of the fourteenth resistor being grounded. A collector of the first transistor is coupled to a first terminal of the twelfth resistor. A second terminal of the twelfth resistor has a common connection with a second terminal of the thirteenth resistor, a cathode of the second diode, and an anode of the third capacitor, a cathode of the third capacitor being grounded, an anode of the second diode being coupled to an auxiliary winding of the transformer.

According to the solution disclosed by the present disclosure, a rectifier circuit is employed to rectify the mains voltage and the rectified voltage is transferred directly to the transformer. A power management circuit is used to control the operating state of the transformer according to the power supply voltage inputted to the transformer so as to enable the constant voltage output winding of the transformer to output a steady voltage and the constant current output winding to output a steady current. The solution of the disclosure has the advantage of low cost since the output function of the switched-mode power supply can be achieved without the need for high-voltage electrolytic capacitors. In addition, the constant voltage output winding is controlled by the constant voltage control circuit to output a constant voltage, while the constant current output winding is controlled by the constant current control circuit to output a constant current, so that the switched-mode power supply is not only rid of the constant current conversion circuit, but able to output a constant voltage source and a constant voltage source that are independent from each other, thereby further reducing the cost of the switched-mode power supply.

The foregoing objects, features and advantages of the present disclosure will be described in further detail with reference to the accompanying drawings.

DETAILED DESCRIPTION OF PREFERRED EMBODIMENTS

Embodiments of the present disclosure will now be described in such definite and comprehensive detail with reference to the accompanying drawings. It is obvious that the embodiments described herein constitute merely part but not all of the embodiments of the disclosure. Furthermore, various embodiments can be combined with one another. However, any such combinations should be predicated on the achievability by those of ordinary skill in the art. Hence, any combinations of different embodiments shall be considered absent nor within the claimed scope of the disclosure should such combinations result in contradiction or unachievability.

A switched-mode power supply is provided by the present disclosure.

Figure 1:
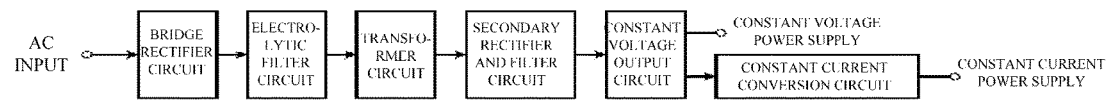
FIG. 1 shows a circuit diagram of a prior art switched-mode power supply.
Figure 2:
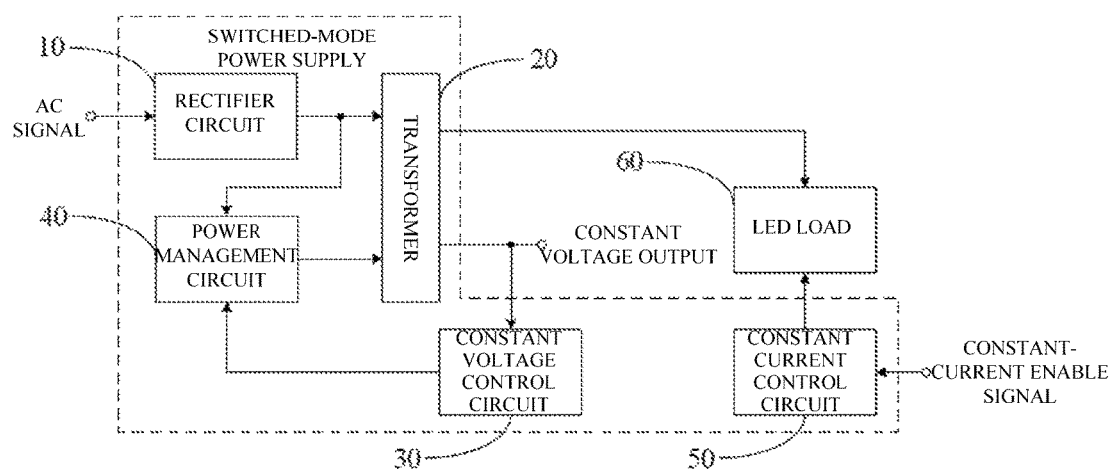
FIG. 2 shows a block diagram illustrating a switched-mode power supply according to an embodiment of the present disclosure.
Figure 3:
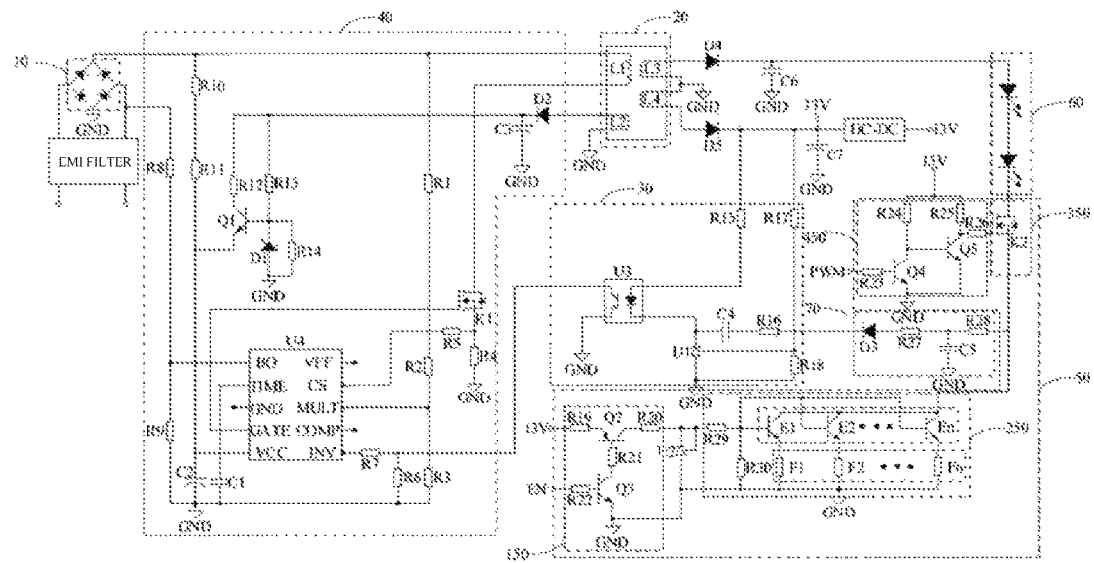
FIG. 3 shows a circuit diagram illustrating a switched-mode power supply according to another embodiment of the present disclosure.
Figure 4:
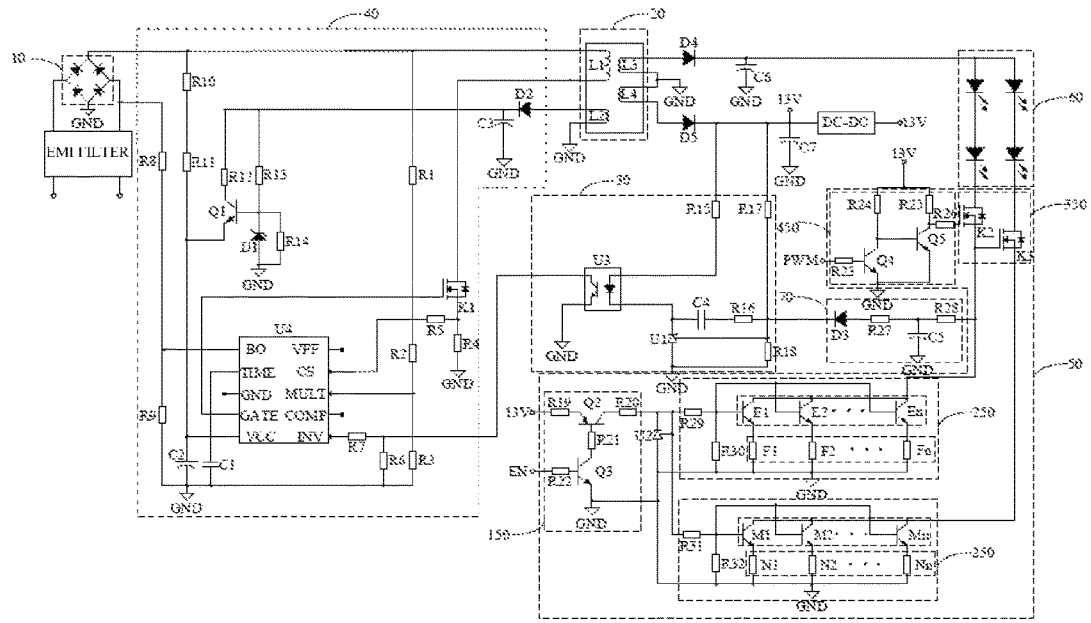
FIG. 4 shows a circuit diagram illustrating a switched-mode power supply according to a further embodiment of the present disclosure.

Referring now to FIGS. 2 to 4. FIG. 2 shows a block diagram of a switched-mode power supply according to an embodiment of the disclosure. FIG. 3 shows a circuit diagram of a switched-mode power supply according to another embodiment of the disclosure. FIG. 4 shows a circuit diagram of a switched-mode power supply according to a further embodiment of the disclosure.

In the embodiment shown in FIG. 2, the switched-mode power supply may comprise a rectifier circuit 10, a transformer 20, a constant voltage control circuit 30, a power management circuit 40 and a constant current control circuit 50. An output terminal of rectifier circuit 10 may be coupled both to a power detection terminal of the power management circuit 40 and to a power input terminal of transformer 20. A controlled terminal of transformer 20 may be coupled to a control terminal of power management circuit 40. A constant voltage output winding of transformer 20 may be coupled through constant voltage control circuit 30 to a feedback input terminal of power management circuit 40. A constant current output winding of transformer 20 may be coupled to constant current control circuit 50 via an LED load 60. The power management circuit 40 may be configured to control the operating state of transformer 20 according to the power supply voltage inputted to transformer 20, so as to enable the constant voltage output winding to output a steady voltage and the constant current output winding to output a steady current. The constant voltage control circuit 20 may be configured to feed back a voltage outputted by the constant voltage output winding to power management circuit 40, so that power management circuit 40 can control the constant voltage output winding of transformer 20 to output a constant voltage. The constant current control circuit 50 may be configured to control the current flowing through LED load 60 to remain constant.

After the switched-mode power supply is connected to the AC mains, rectifier circuit 10 may rectify the mains voltage and outputs the power supply voltage to transformer 20 without the need for the filtering of a high-voltage electrolytic capacitor. The power management circuit 40 may detect of the power supply voltage inputted to transformer 20 and thus output a corresponding control signal to transformer 20 so as to enable the constant voltage output winding of transformer 20 to output a steady voltage and the constant current output winding of transformer 20 to output a steady current.

It should be noted that power management circuit 40 can achieve the steady output of the switched-mode power supply by controlling the output peak current, the fixed OFF duration, or the switching duty ratio of transformer 20, but the specific control method thereof is not limited thereto.

When there is a constant current enable signal inputted to constant current control circuit 50, constant current control circuit 50 may be activated. The constant current control circuit 50 may control the current flowing through LED load 60 to be at a constant magnitude. Simultaneously, the constant voltage control circuit 30 may detect and feed a voltage outputted from the constant voltage output winding of transformer 20 back to the feedback input terminal of power management circuit 40, so that power management circuit 40 can adjust the operating state of transformer 20 so as to enable the constant voltage output winding L4 to output a constant voltage.

When there is no constant current enable signal inputted to constant current control circuit 50, constant current control circuit 50 may be turned off and no current would flow through LED load 60, so that LED load 60 would be off. At the same time, constant voltage control circuit 30 may detect and feed the voltage outputted from the constant voltage output winding of transformer 20 back to the feedback input terminal of power management circuit 40, so that power management circuit 40 can adjust the operating state of transformer 20 so as to enable the constant voltage output winding to output a constant voltage.

According to the solution described above, rectifier circuit 10 is employed to rectify the mains voltage and the rectified voltage is transferred directly to transformer 20. The power management circuit 40 is used to control the operating state of transformer 20 according to the power supply voltage inputted to transformer 20 so as to enable the constant voltage output winding of the transformer 20 to output a steady voltage, and the constant current output winding to output a steady current. The solution of the disclosure has the advantage of low cost since the output function of the switched-mode power supply can be achieved without needing high-voltage electrolytic capacitors. In addition, the constant voltage output winding L4 is controlled by constant voltage control circuit 30 to output a constant voltage source, while the constant current output winding is controlled by constant current control circuit 50 to output a constant current source, so that the switched-mode power supply is not only rid of the constant current conversion circuit, but able to output a constant voltage source and a constant voltage source that are independent from each other, thereby further reducing the cost of the switched-mode power supply.

The power management circuit 40 may comprise a switch circuit (not shown) and a switch control circuit (not shown). A detection terminal of the switch control circuit is the power detection terminal of power management circuit 40. A feedback terminal of the switch control circuit is the feedback input terminal of power management circuit 40. A control terminal of the switch control circuit is coupled to a controlled terminal of the switch circuit. A control terminal of the switch circuit is the control terminal of power management circuit 40.

The switch control circuit may comprise a control chip U4, a first capacitor C1, a first resistor R1, a second resistor R2, a third resistor R3, a fifth resistor R5, a sixth resistor R6, and a seventh resistor R7. An OFF-timing terminal TIME of control chip U4 may be grounded via first capacitor C1, while an OFF-trigger CS terminal of control chip U4 may be coupled to a first terminal of fifth resistor R5. A second terminal of fifth resistor R5 may be configured to input an OFF-trigger signal. A switch control terminal GATE of control chip U4 may be the control terminal of the switch control circuit. An ON-time setting terminal MULT of control chip U4 may be grounded via third resistor R3 and coupled second resistor R2 to a first terminal of first resistor R1. A second terminal of first resistor R1 may be the detection terminal of the switch control circuit. A feedback terminal INV of control chip U4 may be connected to the ground GND via seventh resistor R7 and sixth resistor R6 in series, a node connecting sixth and seventh resistors R6 and R7 being the feedback terminal of the switch control circuit. The switch circuit may comprise a first switch tube K1 and a fourth resistor R4. A drain of first switch tube K1 may be a control terminal of the switch circuit. A gate of first switch tube K1 may be a controlled terminal of the switch circuit. A source of first switch tube K1 may be coupled to a first terminal of the fourth resistor R4, a second terminal of fourth resistor R4 being connected to the ground GND. A node connecting first switch tube K1 and fourth resistor R4 may be configured to output an OFF-trigger signal.

The control chip U4 may be turned on when there is provided a power supply voltage to the power detection terminal of power management circuit 40. The switch control terminal GATE of control chip U4 may then output a high level signal to the gate of first switch tube K1. Because the drain of first switch tube K1 has previously obtained the power supply voltage input, the first switch tube K1 may be turned on, and the control terminal of power management circuit 40 may output a control signal to control transformer 20 to be turned on. At the same time, the sampling circuit constituted by first resistor R1, second resistor R2, and third resistor R3 may input the sampled voltage to ON-time setting terminal MULT of control chip U4 to serve as the reference voltage of OFF-trigger terminal CS of control chip U4, so that the ON-time of first switch tube K1 may vary in the form of a half-sine wave. When the half-sine wave voltage is low, the conduction time of the first switch tube K1 may be long; otherwise when the half-sine wave voltage is high, the conduction time of first switch tube K1 may be short. Hence the need for high-voltage electrolytic capacitors is eliminated, thereby reducing the cost of the switched-mode power supply.

When the conduction time of first switch K1 is exactly equal to the time for which switch control terminal GATE outputs a high level, the switch control terminal GATE of control chip U4 may output a low level signal to the gate of first switch tube K1, so that first switch tube K1 is turned off. As a result, the control terminal of power management circuit 40 would output a control signal to control transformer 20 to be stopped. In the meantime, first capacitor C1 may be charged via the OFF-timing terminal TIME of control chip U4. When the charging of first capacitor C1 is just completed, switch control terminal GATE may again output a high level signal to the gate of first switch tube K1. The power management circuit 40 may repeatedly perform the above process.

It is to be understood that the capacitance of first capacitor C1 may be fixed since the magnitude of the voltage at OFF-timing terminal TIME of control chip U4 is fixed. Thus, the charging time of first capacitor C1 may be fixed, and the time for which first switch tube K1 remains off would be fixed, and so the time for which the control terminal of power management circuit 40 outputs the control signal that controls transformer 20 to stop working would also be fixed. As such, the power management circuit 40 achieves a fixed turned-off time control of transformer 20.

Thereafter, if the magnitude of the voltage at the feedback input terminal of power management circuit 40 changes, the sixth resistor R6 and seventh resistor R7 may transfer the varying-voltage signal to feedback terminal INV of control chip U4, so that control chip U4 can adjust the time for which switch control terminal GATE outputs a high level, thus further adjusting the time for which the control terminal of power management circuit 40 outputs the control signal that controls transformer 20 to be turned on.

The power management circuit 40 may further comprise an eighth resistor R8 and a ninth resistor R9. An overvoltage/undervoltage protection terminal BO of control chip U4 may have a common connection with a first terminal of eighth resistor R8 and a first terminal of ninth resistor R9. A second terminal of ninth resistor R9 may be connected to the ground GND, while a second terminal of eighth resistor R8 may be coupled to an input terminal of rectifier circuit 10.

When power management circuit 40 is turned on, the eighth resistor R8 and ninth resistor R9 may constitute a voltage divider sampling circuit, and the voltage sampled by ninth resistor R9 may be supplied to overvoltage/undervoltage protection terminal BO of control chip U4. If the voltage sampled by ninth resistor R9 is higher than the upper voltage threshold set in overvoltage/undervoltage protection terminal BO or lower than the lower voltage threshold set in overvoltage/undervoltage protection terminal BO, control chip U4 may be turned off.

Since the AC voltage inputted to the switched-mode power supply may have a relatively large fluctuation range in magnitude, the addition of eighth resistor R8 and ninth resistor R9 in power supply management circuit 40 can effectively prevent the AC voltage inputted to the switched-mode power supply from being too high or too low thus causing adverse effects to the circuitry, whereby the reliability of the switched-mode power supply can be improved.

The power management circuit 40 may further comprise a first diode D1, a second diode D2, a first transistor Q1, a second capacitor C2, a third capacitor C3, a tenth resistor R10, an eleventh resistor R11, a twelfth resistor R12, a thirteenth resistor R13, and a fourteenth resistor R14. A first terminal of tenth resistor R10 may be coupled to an output terminal of rectifier circuit 10, while a second terminal of tenth resistor R10 may be coupled to a first terminal of eleventh resistor R11. A second terminal of eleventh resistor R11 may have a common connection with an emitter of first transistor Q1, an anode of second capacitor C2, and a power terminal VCC of control chip U4. A cathode of second capacitor C2 may be connected to the ground GND. A base of first transistor Q1 may have a common connection with a cathode of first diode D1, a first terminal of fourteenth resistor R14, and a first terminal of thirteenth resistor R13. An anode of first diode D1 and a second terminal of fourteenth resistor R14 may be connected to the ground GND. A collector of first transistor Q1 may be coupled to a first terminal of twelfth resistor R12. A second terminal of twelfth resistor R12 may have a common connection with a second terminal of thirteenth resistor R13, a cathode of second diode D2, and an anode of third capacitor C3. A cathode of third capacitor C3 may be connected to the ground GND. An anode of second diode D2 may be coupled to an auxiliary winding of transformer 20. The first diode D1 may be a constant voltage diode, and the first transistor Q1 may be an NPN type transistor.

When there is a power supply voltage inputted to the power detection terminal of power management circuit 40, second capacitor C2 may be charged through the voltage past tenth resistor R10 and eleventh resistor R11. When the voltage of second capacitor C2 reaches a certain level, power terminal VCC of control chip U4 may be able to obtain a start-up voltage and so control chip U4 may be activated. The second diode D2 and third resistor R3 may rectify and filter and further output the voltage outputted from auxiliary winding L2 of transformer 20. The voltage regulating circuit constituted by first transistor Q1, first diode D1, twelfth resistor R12, thirteenth resistor R13, and fourteenth resistor R14 may stabilize and output the rectified and filtered power supply voltage to power terminal VCC, so that power terminal VCC of control chip U4 can derive a stable supply voltage and so control chip U4 would be able to operate stably. Thus, a power supply used for supplying an operating voltage to control chip U4 can be omitted, which further reduces the cost of the switched-mode power supply.

The constant voltage control circuit 30 may comprise a first voltage regulating tube U1, a fourth capacitor C4, an optocoupler U3, a fifteenth resistor R15, a sixteenth resistor R16, a seventeenth resistor R17, and an eighteenth resistor R18. An emitter of optocoupler U3 may be connected to the ground GND. A collector of optocoupler U3 may be a feedback output terminal of constant voltage control circuit 30. A cathode of optocoupler U3 may have a common connection with a first terminal of fourth capacitor C4 and a cathode of first voltage regulating tube U1. A second terminal of fourth capacitor C4 may be coupled to a first terminal of sixteenth resistor R16. A second terminal of sixteenth resistor R16 may have a common connection with a second terminal of seventeenth resistor R17, a first terminal of eighteenth resistor R18, and a regulating terminal of first voltage regulating tube U1. An anode of first voltage regulating tube U1 and a second terminal of eighteenth resistor R18 may be connected to the ground GND. A first terminal of seventeenth resistor R17 may be coupled to a first terminal of fifteenth resistor R15. A second terminal of fifteenth resistor R15 may be coupled to an anode of optocoupler U3. The node connecting the fifteenth and seventeenth resistor R15 and R17 may be the input terminal of constant voltage control circuit 30.

When constant voltage control circuit 30 is turned on, fifteenth resistor R15 may deliver the voltage outputted from constant voltage output winding L4 to the anode of optocoupler U3. The seventeenth resistor R17 and eighteenth resistor R18 may constitute a voltage divider circuit, and eighteenth resistor R18 may supply the sampled output voltage of constant voltage output winding L4 to the regulating terminal of first voltage regulating tube U1, and the sampled and regulated output voltage of constant voltage output winding L4 would then be transferred to the cathode of optocoupler U3. When the voltage outputted from constant-voltage output winding L4 changes, the current flowing between the anode and the cathode of optocoupler U3 may also change. The constant voltage control circuit 30 may supply the varying current to power management circuit 40 so that power management circuit 40 may output a corresponding control signal to adjust the operating state of transformer 20, so as to keep the voltage outputted from constant voltage output winding L4 to remain constant in magnitude.

The constant current control circuit 50 may comprise a reference voltage output unit 150, a constant current control unit 250, a switch unit 350, and a switch control unit 450. A controlled terminal of switch unit 350 may be coupled to a control terminal of switch control unit 450. An input terminal of switch unit 350 may be coupled to LED load 60. An output terminal of switch unit 350 may be coupled to a control terminal of constant current control unit 250. A power terminal of constant current control unit 250 may be coupled to an output terminal of reference voltage output unit 150.

When switch control unit 450 controls switch unit 350 to be turned on, constant current control circuit 50 may be activated, and the current output of constant current output winding L3 may flow into constant current control unit 250. At the same time, reference voltage output unit 150 may output a reference voltage to constant current control unit 250, so that the control terminal of constant current control unit 250 can output a control signal that controls the magnitude of the current flowing through LED load 60.

It should be noted that when LED load 60 includes a number of m groups of LED strips, constant current control circuit 50 may correspondingly include a number of m constant current control units 250. As such, the switched-mode power supply can be applied with any number of backlight strip channels, thus achieving versatility. FIG. 4 shows a circuit configuration of a switched-mode power supply in which LED load 60 comprises two groups of LED strips and constant current control circuit 50 comprises two constant current control units 250.

The constant current control unit may comprise a twenty-ninth resistor R29, a thirtieth resistor R30, and a number of n transistors (E1, E2, through En shown in FIGS. 3 and 4). Bases of the n transistors, a first terminal of twenty-ninth resistor R29, and a first terminal of thirtieth resistor R30 may be coupled to each other. A second terminal of thirtieth resistor R30 may be connected to the ground GND, while a second terminal of twenty-ninth resistor R29 may be configured to input a reference voltage. Collectors of the multiple transistors may be coupled to each other, and the connection node thereof may be the control terminal of the constant current control unit. An emitter of each of the n transistors may be connected to the ground GND via a current limiting resistor (F1, F2, through Fn as shown in FIGS. 3 and 4), n being a natural number.

In the present embodiment, n=3, and a specific configuration is referred to in FIG. 3. When constant current control unit 250 is turned on, the reference voltage is inputted through twenty-ninth resistor R29 to first control transistor E1, second control transistor E2, through n-th control transistor En, so as to control the magnitude of the current flowing through first current limiting control resistor F1, second current limiting control resistor F2, through n-th current limiting control circuit Fn and thus further control the magnitude of the current at the collectors of first control transistor E1, second control transistor E2, through n-th control transistor En, thereby achieving the purpose of controlling the magnitude of the current flowing through LED load 60.

The reference voltage output unit 150 may comprise an input terminal EN configured to input a constant-current enable signal for controlling the ON-OFF of LED load 60. The reference voltage output unit 150 may comprise a second transistor Q2, a third transistor Q3, a nineteenth resistor R19, a twentieth resistor R20, a twenty-first resistor R21, and a twenty-second resistor R22. A first terminal of nineteenth resistor R19 may be configured to input a reference voltage. A second terminal of nineteenth resistor R19 may be coupled to an emitter of second transistor Q2. A collector of second transistor Q2 may be coupled to a first terminal of twentieth resistor R20. A second terminal of twentieth resistor R20 may be the output terminal of reference voltage output unit R150. A base of second transistor Q2 may be coupled to a first terminal of twenty-first resistor R21. A second terminal of twenty-first resistor R21 may be coupled to a collector of third transistor Q3. An emitter of third transistor Q3 may be coupled to the ground GND. A base of third transistor Q3 may be coupled to a first terminal of twenty-second resistor R22. A second terminal of twenty-second resistor R22 may be an input terminal of reference voltage output unit 150. Note, in the present embodiment second transistor Q2 may be a PNP type transistor, while third transistor Q3 may be an NPN type transistor.

If constant-current enable signal EN is a low level, then third transistor Q3 may be turned off, in turn second transistor Q2 may be turned off, and reference voltage output unit 150 may made no reference voltage output. Otherwise, if constant current enable signal EN is a high level, third transistor Q3 may be turned on, in turn second transistor Q2 may be turned on, and thus reference voltage output unit 150 may supply the inputted reference voltage to switch control unit 250.

The switch unit 350 may comprise a second switch tube K2, of which the drain serves as the input terminal of switch unit 350, a source serves as the output terminal of switch unit 350, and a gate serves as the controlled terminal of switch unit 350. It should be noted that, when LED load 60 includes a number of p groups of LED light strips, switch unit 350 may correspondingly include a number of p switch tubes. FIG. 4 shows a circuit configuration in which LED load 60 comprises two groups of LED strips while switch unit 350 comprises two switch tubes.

The switch control unit 450 may comprise a fourth transistor Q4, a fifth transistor Q5, a twenty-third resistor R23, a twenty-fourth resistor R24, a twenty-fifth resistor R25, and a twenty-sixth resistor R26. A first terminal of twenty-third resistor R23 may be configured to input a PWM signal. A second terminal of twenty-third resistor R23 may be coupled to a base of fourth transistor Q4. A collector of fourth transistor Q4 may have a common connection with a first terminal of twenty-fourth resistor R24 and a base of fifth transistor Q5. Emitters of the fourth and fifth transistors Q4 and Q5 may be connected to the ground GND. A collector of fifth transistor Q5 may have a common connection with a first terminal of twenty-fifth resistor R25 and a first terminal of twenty-sixth resistor R26. A second terminal of twenty-fourth resistor R24 and a second terminal of twenty-fifth resistor R25 may be coupled to the constant voltage output winding L4. A second terminal of twenty-sixth resistor R26 may be the control terminal of switch control unit 450. Note, in the present embodiment both fourth transistor Q4 and fifth transistor Q5 may be NPN type transistors.

When the PWM signal is a high level, fourth transistor Q4 may be turned on, in turn fifth transistor Q5 may be turned on, and as a result switch control unit 450 would output a control signal that controls switch unit 350 to be turned on. Otherwise when the PWM signal is a low level, the fourth transistor Q4 may be turned off, so the fifth transistor Q5 may be turned off and as a result switch control unit 450 may output a control signal that controls switch unit 350 to be turned off.

Furthermore, the switched-mode power supply may further comprise a correction circuit 70. An input terminal of correction circuit 70 may be coupled to the feedback output terminal of constant current control circuit 50. An output terminal of correction circuit 70 may be coupled to the input terminal of constant voltage control circuit 30.

When there is a relatively large voltage difference in the LED lights of LED load 60, correction circuit 70 may transfer the abnormal voltage differential signal to the input terminal of constant voltage control circuit 30, and constant voltage control circuit 30 in turn may transfer the abnormal voltage differential signal to power management circuit 40, so that power management circuit 40 may accordingly adjust the operating state of transformer 20 to stabilize the current flowing through the LED lights and at the same time the voltage output of constant voltage output winding L4 of transformer 20 may remain constant.

The correction circuit 70 may comprise a third diode D3, a fifth capacitor C5, a twenty-seventh resistor R27, and a twenty-eighth resistor R28. A first terminal of twenty-eighth resistor R28 may be the input terminal of correction circuit 70. A second terminal of twenty-eighth resistor R28 may have a common connection with an anode of fifth resistor R5, and a first terminal of twenty-seventh resistor R27. A cathode of fifth capacitor C5 may be connected to the ground GND. A second terminal of twenty-seventh resistor R27 may be coupled to an anode of third diode D3. A cathode of third diode D3 may be the output terminal of correction circuit 70.

When the voltage flowing through LED load 60 varies, the voltage inputted to twenty-eighth resistor R28 may vary, so that the voltage outputted by the cathode of third diode D3 may also vary and consequently correction circuit 70 would output a varying voltage signal. Further power management circuit 40 may control the voltage outputted from constant voltage output winding L4 of transformer 20 to be lowered, so as to reduce the temperature rise of constant current control circuit 50. This solves the problem of a large output voltage difference due to a large voltage variation in the LED lights of the same screen body in mass production.

Below the working principle of the switched-mode power supply of the present disclosure will be illustrated in detail in connection with FIGS. 1 through 4.

After the switched-mode power supply of the present disclosure is connected to the mains, the EMI filter may perform filtering of the mains voltage and supply the filtered voltage to the first terminal of eighth resistor R8 and to rectifier circuit 10. The eighth resistor R8 and ninth resistor R9 may constitute a voltage divider sampling circuit. The sampled voltage may be inputted to overvoltage/undervoltage protection terminal BO of control chip U4. If the mains voltage is too high or too low hence not within the preset voltage range, then control chip U4 may be stopped. The preset voltage range may fall between 65V and 310V. If the mains voltage is within the preset voltage range, then control chip U4 may enter the start-up state. As such, the overvoltage/undervoltage protection function of the switched-mode power supply is achieved. At the same time, rectifier circuit 10 may rectify and output the mains voltage. The second capacitor C2 may be charged via the voltage past tenth resistor R10 and eleventh resistor R11. When the voltage of second capacitor C2 is sufficient to activate control chip U4, control chip U4 would start to work.

The switch control terminal GATE of control chip U4 may output a high level signal to the gate of first switch tube K1. Since the drain of first switch tube K1 has previously received the rectified mains voltage, first switch tube K1 would be turned on, thereby the transformer 20 would start to work.

On one hand, the output voltage source of auxiliary winding L2 of transformer 20 is rectified and filtered by second diode D2 and third capacitor C3, and then transferred to the second terminal of thirteenth resistor R13 and further regulated by the voltage regulator circuit constituted by first transistor Q1, first diode D1, twelfth resistor R12, thirteenth resistor R13, and fourteenth resistor R14. The regulated voltage may then be conveyed to power terminal VCC of control chip U4, whereby the control chip U4 would be able to operate stably.

On the other hand, control chip U4 may control the conduction time of first switch tube K1 according to the power supply voltage sampled by third resistor R3, and so further control the ON-duration of transformer 20, so that the voltage outputted by constant voltage output winding L4 and the current outputted by constant current output winding L3 can be stabilized within a certain range.

Thereafter, if the voltage output of constant voltage output winding L4 changes, then fifteenth resistor R15 may transfer the varying voltage to the anode of optocoupler U3. The current flowing between the anode and the cathode of optocoupler U3 may vary. So the collector voltage of optocoupler U3 may vary and the voltage inputted to feedback terminal INV of control chip U4 may also. Therefore, control chip U4 may adjust its duty ratio by which switch control terminal GATE outputs the high level, so as to change the conduction duty ratio of first switch tube K1, thereby stabilizing the voltage outputted by constant voltage output winding L4. It should be noted that when the voltage outputted from constant-voltage output winding L4 increases, the conduction duty ratio of first switch tube K1 may decrease; otherwise when the voltage outputted from constant-voltage output winding L4 decreases, the conduction duty ratio of first switch tube K1 may increase. If the switched-mode power supply is applied to the TV set, then the constant voltage outputted from constant voltage output winding L4 can be rectified and filtered and further supplied to the TV chassis, while the constant current outputted by constant current output winding L3 can be rectified and filtered and further supplied to LED load 60 (TV backlight). In order to reduce the ripple of the constant voltage source outputted by the switched-mode power supply, an additional DC-DC circuit (as shown in FIG. 3 or FIG. 4) can be provided in order to further optimize the rectified and filtered constant voltage, where the specific optimization treatment is not limited herein.

In the standby mode, the above constant current enable signal EN may be a low level, so third transistor Q3 would be off and in turn second transistor Q2 would off, thus a current circuit cannot be formed between LED load 60 and the switched-mode power supply, and so LED load 60 would be off. At the same time, constant voltage control circuit 30 may sample the voltage source outputted by constant voltage output winding L4 and supply it to power management circuit 40, so that power management circuit 40 may control the voltage outputted by constant voltage output winding L4 to be stabilized. In this case, transformer 20 may operate in a cycle skipping manner to achieve a light load and high efficiency, thereby the low standby demand can be satisfied and no standby auxiliary power supply would be needed, which simplifies the circuitry and reduces the costs.

After the power-on, the constant-current enable signal EN may be a high level, so third transistor Q3 would be turned on and in turn second transistor Q2 would be turned on, thereby the reference voltage outputted by reference voltage output unit 150 (reference voltage of 13V as shown in FIG. 3 or 4) may supply a resonance source to constant current control unit 250 through second transistor Q2. Simultaneously, the PWM signal may drive second switch tube K2 (and third switch tube K3) through switch control circuit 450, whereby the LED load 60 may switch its ON/OFF state in accordance with the PWM signal.

When the PWM signal is a high level, fourth transistor Q4 may be turned on, and in turn fifth transistor Q5 may be turned on. Then second switch tube K2 (and the third switch tube) may be turned on, and so the output current of the constant voltage output winding may flow into the collectors of first control transistor E1, second control transistor E2 through n-th control transistor En (first adjusting transistor M1, second adjusting transistor M2 through n-th adjusting transistor Mn) through LED load 60 and second switch tube K2 (and/or third switch tube K3). In the meantime, the reference voltage outputted by reference voltage output unit 150 may control the bases of the respective transistors through twenty-ninth resistor R29 and thus further control the current flowing through LED load 60 to be stabilized. It is to be noted that first current limiting control resistor F1, second current limiting control resistor F2 through n-th current limiting control circuit Fn (and first current limiting adjusting resistor N1, second current limiting adjusting resistor N2 through n-th current limiting adjusting resistor Nn) are all the current limiting resistors of LED load 60. At the same time, constant voltage control circuit 30 may sample the voltage source outputted by constant voltage output winding L4 and supply the sampled voltage to power management circuit 40, so that power management circuit 40 may control the voltage outputted by constant voltage output winding L4 to be stabilized. Thus far, the switched-mode power supply of the present disclosure realizes the function of simultaneously outputting the constant voltage source and the constant current source, thereby not only satisfying the constant current demand of LED load 60, but satisfying the constant voltage demand of the TV chassis, which optimizes the system structure and reduces the costs.

When the PWM signal is at a low level, fourth transistor Q4 may be turned off, and in turn fifth transistor Q5 may be turned off, so second switch tube K2 (and third switch tube K3) would be turned off, and the current circuit between LED load 60 and the switched-mode power supply may be cut off and the LED load 60 would be turned off. At the same time, constant voltage control circuit 30 may sample the voltage source outputted by constant voltage output winding L4 and supply the sampled voltage to power management circuit 40, thereby power management circuit 40 may control the voltage outputted by constant voltage output winding L4 to be stabilized.

If the voltage difference applied across the LED light is large, then the voltage applied to the collectors of first control transistor E1, second control transistor E2 through n-th control transistor En (first adjusting transistor M1, second adjusting transistor E2 through n-th adjusting transistor Mn) may increase, thus causing a high temperature rise of various transistors and current limiting resistors in constant current control unit 50. At this point, the correction circuit 70 composed of third diode D3, twenty-seventh resistor R27, twenty-eighth resistor R28, and fifth capacitor C5 may transfer the excessively high temperature rise signal to power management circuit 40 through constant voltage control circuit 30, so that power management circuit 40 may control the voltage outputted by constant voltage output winding L4 of transformer 20 to be lowered so as to reduce the temperature rise of constant current control unit 250. This solves the problem of a large output voltage difference due to a large voltage variation in LED lights of the same screen body in mass production.

Figure 5:
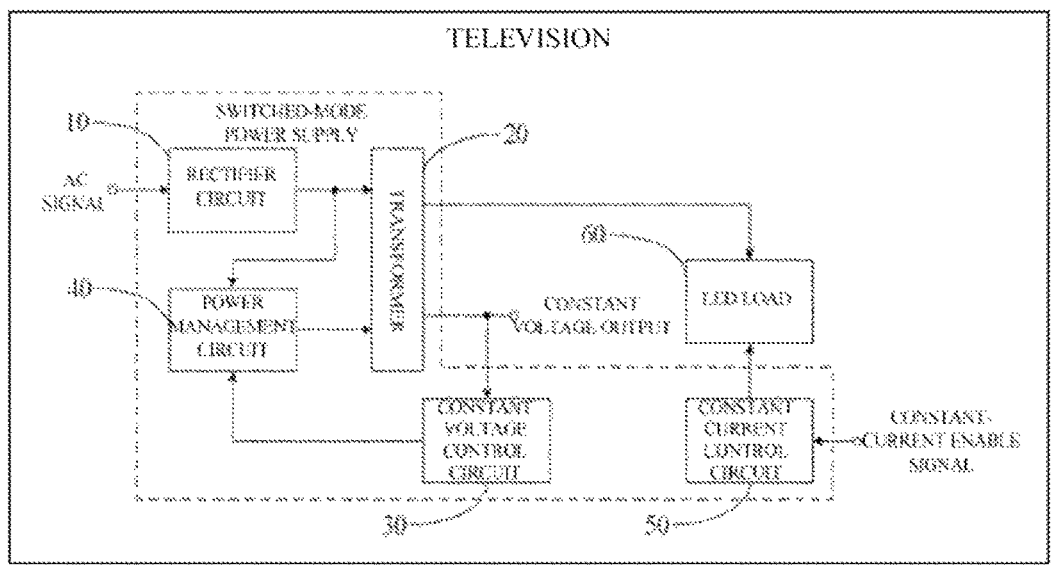
FIG. 5 shows a television including the switched-mode power supply according to an embodiment of the disclosure.

Referring to FIG. 5, there is also provided a television that comprises the switched-mode power supply as described above, the switched-mode power supply having particular arrangements described in the above embodiments. Because the television employs all of the features of the above embodiments, all of the advantages of the above embodiments are present here and are not to be repeated herein.

The foregoing description merely depicts some exemplary embodiments of the present disclosure and therefore is not intended as limiting the scope of the disclosure. Any equivalent structural transformations made to the disclosure, or any direct or indirect applications of the disclosure on any other related fields based on the concepts of the present disclosure, shall all fall in the scope of the disclosure.

We claim:

1. A switched-mode power supply comprising a rectifier circuit, a transformer, a constant voltage control circuit, a power management circuit, and a constant current control circuit, wherein an output terminal of the rectifier circuit is coupled both to a power detection terminal of the power management circuit and to a power input terminal of the transformer, a controlled terminal of the transformer is coupled to a control terminal of the power management circuit, a constant voltage output winding of the transformer is coupled through the constant voltage control circuit to a feedback input terminal of the power management circuit, and a constant current output winding of the transformer is coupled to the constant current control circuit via an LED load, wherein
   the power management circuit is configured to control an operating state of the transformer according to a power supply voltage inputted to the transformer, so as to enable the constant voltage output winding to output a steady voltage and the constant current output winding to output a steady current;
   the constant voltage control circuit is configured to feed back a voltage outputted by the constant voltage output winding to the power management circuit, so that the power management circuit controls the constant voltage output winding of the transformer to output a constant voltage; and
   the constant current control circuit is configured to control a current flowing through the LED load to be stabilized.

2. The switched-mode power supply according to claim 1, wherein the power management circuit comprises a switch circuit and a switch control circuit, a detection terminal of the switch control circuit being the power detection terminal of the power management circuit, a feedback terminal of the switch control circuit being the feedback input terminal of the power management circuit, a control terminal of the switch control circuit being coupled to a controlled terminal of the switch circuit, a control terminal of the switch circuit being the control terminal of the power management circuit.

3. The switched-mode power supply according to claim 2, wherein the power management circuit further comprises a first diode, a second diode, a first transistor, a second capacitor, a third capacitor, a tenth resistor, an eleventh resistor, a twelfth resistor, a thirteenth resistor, and a fourteenth resistor, wherein a first terminal of the tenth resistor is coupled to the power detection terminal, a second terminal of the tenth resistor is coupled to a first terminal of the eleventh resistor, a second terminal of the eleventh resistor has a common connection with an emitter of the first transistor, a positive electrode of the second capacitor, and a power terminal of the control chip, a negative electrode of the second capacitor being grounded; a base of the first transistor has a common connection with a negative electrode of the first diode, a first terminal of the fourteenth resistor, and a first terminal of the thirteenth resistor, positive electrode of the first diode and a second terminal of the fourteenth resistor being grounded; a collector of the first transistor is coupled to a first terminal of the twelfth resistor, a second terminal of the twelfth resistor has a common connection with a second terminal of the thirteenth resistor, a negative electrode of the second diode, and a positive electrode of the third capacitor, a negative electrode of the third capacitor being grounded, a positive electrode of the second diode being coupled to an auxiliary winding of the transformer.

4. The switched-mode power supply according to claim 2, wherein the switch circuit comprises a first switch transistor and a fourth resistor, a drain of the first switch transistor being a control terminal of the switch circuit, a gate of the first switch transistor being a controlled terminal of the switch circuit, a source of the first switch transistor being coupled to a first terminal of the fourth resistor, a second terminal of the fourth resistor being grounded, and a node connecting the first switch transistor and the fourth resistor being configured to output an OFF-trigger signal.

5. The switched-mode power supply according to claim 2, wherein the switch control circuit comprises a control chip, a first capacitor, a first resistor, a second resistor, a third resistor, a fifth resistor, a sixth resistor, and a seventh resistor, wherein an OFF-timing terminal of the control chip is grounded via the first capacitor, an OFF-trigger terminal of the control chip is coupled to a first terminal of the fifth resistor, a second terminal of the fifth resistor being configured to input an OFF-trigger signal; a switch control terminal of the control chip is the control terminal of the switch control circuit, an ON-time setting terminal of the control chip is grounded via the third resistor and coupled through the second resistor to a first terminal of the first resistor, and a second terminal of the first resistor is the detection terminal of the switch control circuit; a feedback terminal of the control chip is grounded via the seventh resistor and the sixth resistor in series, a node connecting the sixth and the seventh resistors being the feedback terminal of the switch control circuit.

6. The switched-mode power supply according to claim 5, wherein the power management circuit further comprises an eighth resistor and a ninth resistor, an overvoltage/undervoltage protection terminal of the control chip having a common connection with a first terminal of the eighth resistor and a first terminal of the ninth resistor, a second terminal of the ninth resistor being grounded, a second terminal of the eighth resistor being coupled to an input terminal of the rectifier circuit.

7. The switched-mode power supply according to claim 1, wherein the constant voltage control circuit comprises a first voltage regulating transistor, a fourth capacitor, an optocoupler, a fifteenth resistor, a sixteenth resistor, a seventeenth resistor, and an eighteenth resistor, an emitter of the optocoupler being grounded, a collector of the optocoupler being a feedback output terminal of the constant voltage control circuit, a negative electrode of the optocoupler having a common connection with a first terminal of the fourth capacitor and a negative electrode of the first voltage regulating transistor, a second terminal of the fourth capacitor being coupled to a first terminal of the sixteenth resistor, a second terminal of the sixteenth resistor having a common connection with a second terminal of the seventeenth resistor, a first terminal of the eighteenth resistor, and a regulating terminal of the first voltage regulating transistor, a positive electrode of the first voltage regulating transistor and a second terminal of the eighteenth resistor being grounded; a first terminal of the seventeenth resistor being coupled to a first terminal of the fifteenth resistor, a second terminal of the fifteenth resistor being coupled to a positive electrode of the optocoupler, a node connecting the fifteenth and the seventeenth resistor being an input terminal of the constant voltage control circuit.

8. The switched-mode power supply according to claim 1, wherein the constant current control circuit comprises a reference voltage output unit, a constant current control unit, a switch unit, and a switch control unit, wherein a controlled terminal of the switch unit is coupled to a control terminal of the switch control unit, an input terminal of the switch unit is coupled to the LED load, an output terminal of the switch unit is coupled to a control terminal of the constant current control unit, and a power terminal of the constant current control unit is coupled to an output terminal of the reference voltage output unit.

9. The switched-mode power supply according to claim 8, wherein the constant current control unit comprises a twenty-ninth resistor, a thirtieth resistor, and a number of n transistors, wherein bases of the n transistors, a first terminal of the twenty-ninth resistor, and a first terminal of the thirtieth resistor are coupled to each other, a second terminal of the thirtieth resistor being grounded, a second terminal of the twenty-ninth resistor being configured to input a reference voltage, collectors of the transistors are coupled to each other and a connection node thereof is the control terminal of the constant current control unit, and an emitter of each of the n transistors is grounded via a current limiting resistor, n being a natural number.

10. The switched-mode power supply according to claim 8, wherein the reference voltage output unit comprises an input terminal configured to input a constant-current enable signal for controlling the ON-OFF of the LED load, the reference voltage output unit comprising a second transistor, a third transistor, a nineteenth resistor, a twentieth resistor, a twenty-first resistor, and a twenty-second resistor, wherein a first terminal of the nineteenth resistor is configured to input a reference voltage, a second terminal of the nineteenth resistor is coupled to an emitter of the second transistor, a collector of the second transistor is coupled to a first terminal of the twentieth resistor, a second terminal of the twentieth resistor being the output terminal of the reference voltage output unit; a base of the second transistor is coupled to a first terminal of the twenty-first resistor, a second terminal of the twenty-first resistor is coupled to a collector of the third transistor, an emitter of the third transistor is grounded; a base of the third transistor is coupled to a first terminal of the twenty-second resistor, a second terminal of the twenty-second resistor being the input terminal of the reference voltage output unit.

11. The switched-mode power supply according to claim 8, wherein the switch unit comprises a second switch transistor, a drain of the second switch transistor being the input terminal of the switch unit, a source of the second switch transistor being the output terminal of the switch unit, a gate of the second switch transistor being the controlled terminal of the switch unit.

12. The switched-mode power supply according to claim 8, wherein the switch control unit comprises a fourth transistor, a fifth transistor, a twenty-third resistor, a twenty-fourth resistor, a twenty-fifth resistor, and a twenty-sixth resistor, wherein a first terminal of the twenty-third resistor is configured to input a PWM signal, a second terminal of the twenty-third resistor is coupled to a base of the fourth transistor, a collector of the fourth transistor has a common connection with a first terminal of the twenty-fourth resistor and a base of the fifth transistor, emitters of the fourth and fifth transistors are grounded, a collector of the fifth transistor has a common connection with a first terminal of the twenty-fifth resistor and a first terminal of the twenty-sixth resistor, a second terminal of the twenty-fourth resistor and a second terminal of the twenty-fifth resistor are coupled to the constant voltage output winding, and a second terminal of the twenty-sixth resistor is the control terminal of the switch control unit.

13. The switched-mode power supply according to claim 1, further comprising a correction circuit, an input terminal of the correction circuit being coupled to the feedback output terminal of the constant current control circuit, an output terminal of the correction circuit being coupled to the input terminal of constant voltage control circuit.

14. The switched-mode power supply according to claim 13, wherein the correction circuit comprises a third diode, a fifth capacitor, a twenty-seventh resistor, and a twenty-eighth resistor, wherein a first terminal of the twenty-eighth resistor is the input terminal of the correction circuit, a second terminal of the twenty-eighth resistor has a common connection with a positive electrode of the fifth capacitor, and a first terminal of the twenty-seventh resistor, a negative electrode of the fifth capacitor is grounded, a second terminal of the twenty-seventh resistor is coupled to a positive electrode of the third diode, and a negative electrode of the third diode is the output terminal of the correction circuit.

15. A television comprising a switched-mode power supply, the switched-mode power supply comprising a rectifier circuit, a transformer, a constant voltage control circuit, a power management circuit, and a constant current control circuit, wherein an output terminal of the rectifier circuit is coupled both to a power detection terminal of the power management circuit and to a power input terminal of the transformer, a controlled terminal of the transformer is coupled to a control terminal of the power management circuit, a constant voltage output winding of the transformer is coupled through the constant voltage control circuit to a feedback input terminal of the power management circuit, and a constant current output winding of the transformer is coupled to the constant current control circuit via an LED load, wherein the power management circuit is configured to control an operating state of the transformer according to a power supply voltage inputted to the transformer, so as to enable the constant voltage output winding to output a steady voltage and the constant current output winding to output a steady current;

the constant voltage control circuit is configured to feed back a voltage outputted by the constant voltage output winding to the power management circuit, so that the power management circuit controls the constant voltage output winding of the transformer to output a constant voltage; and the constant current control circuit is configured to control a current flowing through the LED load to, be stabilized.

16. The television according to claim 15, wherein the power management circuit comprises a switch circuit and a switch control circuit, a detection terminal of the switch control circuit being the power detection terminal of the power management circuit, a feedback terminal of the switch control circuit being the feedback input terminal of the power management circuit, a control terminal of the switch control circuit being coupled to a controlled terminal of the switch circuit, a control terminal of the switch circuit being the control terminal of the power management circuit.

17. The television according to claim 16, wherein the power management circuit further comprises a first diode, a second diode, a first transistor, a second capacitor, a third capacitor, a tenth resistor, an eleventh resistor, a twelfth resistor, a thirteenth resistor, and a fourteenth resistor, wherein a first terminal of the tenth resistor is coupled to the power detection terminal, a second terminal of the tenth resistor is coupled to a first terminal of the eleventh resistor, a second terminal of the eleventh resistor has a common connection with an emitter of the first transistor, a positive electrode of the second capacitor, and a power terminal of the control chip, a negative electrode of the second capacitor being grounded; a base of the first transistor has a common connection with a negative electrode of the first diode, a first terminal of the fourteenth resistor, and a first terminal of the thirteenth resistor, a positive electrode of the first diode and a second terminal of the fourteenth resistor being grounded; a collector of the first transistor is coupled to a first terminal of the twelfth resistor, a second terminal of the twelfth resistor has a common connection with a second terminal of the thirteenth resistor, a negative electrode of the second diode, and a a positive electrode of the third capacitor, a negative electrode of the third capacitor being grounded, a positive electrode of the second diode being coupled to an auxiliary winding of the transformer.

18. The television according to claim 16, wherein the switch circuit comprises a first switch transistor and a fourth resistor, a drain of the first switch transistor being a control terminal of the switch circuit, a gate of the first switch transistor being a controlled terminal of the switch circuit, a source of the first switch transistor being coupled to a first terminal of the fourth resistor, a second terminal of the fourth resistor being grounded, and a node connecting the first switch transistor and the fourth resistor being configured to output an OFF-trigger signal.

19. The television according to claim 16, wherein the switch control circuit comprises a control chip, a first capacitor, a first resistor, a second resistor, a third resistor, a fifth resistor, a sixth resistor, and a seventh resistor, wherein an OFF-timing terminal of the control chip is grounded via the first capacitor, an OFF-trigger terminal of the control chip is coupled to a first terminal of the fifth resistor, a second terminal of the fifth resistor being configured to input an OFF-trigger signal; a switch control terminal of the control chip is the control terminal of the switch control circuit, an ON-time setting terminal of the control chip is grounded through the third resistor and coupled through the second resistor to a first terminal of the first resistor, and a second terminal of the first resistor is the detection terminal of the switch control circuit; a feedback terminal of the control chip is grounded via the seventh resistor and the sixth resistor in series, a node connecting the sixth and the seventh resistors being the feedback terminal of the switch control circuit.

20. The television according to claim 19, wherein the power management circuit further comprises an eighth resistor and a ninth resistor, an overvoltage/undervoltage protection terminal of the control chip having a common connection with a first terminal of the eighth resistor and a first terminal of the ninth resistor, a second terminal of the ninth resistor being grounded, a second terminal of the eighth resistor being coupled to an input terminal of the rectifier circuit.

* * * * *